C. M. BULLOCK & J. T. WICKERSHAM.
TAIL LAMP.
APPLICATION FILED APR. 20, 1916.
1,198,323.
Patented Sept. 12, 1916.
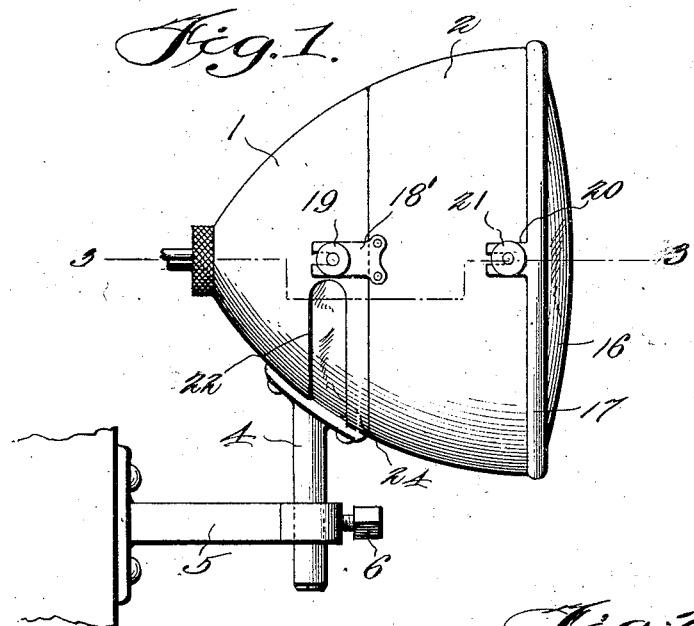
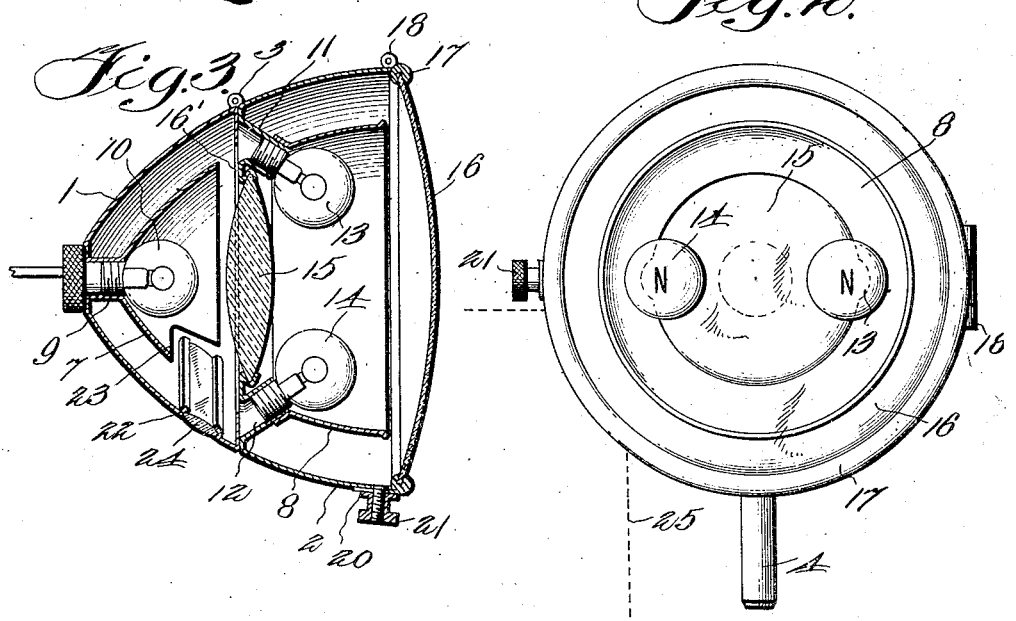
WITNESSES
W. May Duvall.
Lloyd W. Patch
INVENTORS.
Carl M. Bullock and
John T. Wickersham,
BY Richard B. Owen,
ATTORNEY

UNITED STATES PATENT OFFICE.

CARL M. BULLOCK AND JOHN T. WICKERSHAM, OF BARDSTOWN JUNCTION, KENTUCKY.

TAIL-LAMP.

1,198,323.   Specification of Letters Patent.   Patented Sept. 12, 1916.

Application filed April 20, 1916. Serial No. 92,497.

*To all whom it may concern:*

Be it known that we, CARL M. BULLOCK and JOHN T. WICKERSHAM, citizens of the United States, residing at Bardstown Junction, in the county of Bullitt and State of Kentucky, have invented certain new and useful Improvements in Tail-Lamps, of which the following is a specification.

An object of this invention is to provide a tail lamp which may be used for automobiles, or other vehicles, and which will comply with the laws now almost universally enacted, requiring that a red light be shown at the rear of the vehicle, and which is so constructed that it will furnish a white light to the rear of the vehicle, to light the way when backing the machine at night on a strange road, into and out of garages, and in turning, etc., and will also act to throw a light on the license tag or plate.

A further object is to so construct the lamp that the electric bulbs or other sources of light rays may be independently or simultaneously lighted and the desired showing of light at the rear of the vehicle will occur, and to so arrange the parts that access may be had readily to all parts of the lamp, and the lamp structure as an entirety may be fitted to be held and mounted on a lamp bracket of usual form.

With the above and other objects in view, our invention consists in certain novel features of construction and combinations of parts which will be hereinafter set forth in connection with the drawings and then more particularly pointed out in the claims.

In the drawings: Figure 1 is a view in side elevation of a lamp constructed after our invention. Fig. 2 is a view in front elevation of the lamp. Fig. 3 is a horizontal sectional view taken on the line 3—3 of Fig. 1.

The lamp casing comprises a dished-out or bowl-shaped member 1 and the rim member 2, these two members being connected together by a hinge 3, so that the rim member 2 may be swung to a relation to form substantially a continuation of the bowl member 1. A stem 4 is riveted or otherwise secured to the bowl member 1 and is so shaped that it may be received in a mounting bracket 5, or may be fitted in some other desired relation to properly support the lamp case. Where the mounting bracket 5 is used, it will be secured upon the frame, body, or some other portion of the rear of the vehicle and the stem 4 will be received through a suitable socket provided therein, the set screw 6 being fitted in this mounting bracket to be adjusted against the stem 4 to hold the lamp case adjusted to the proper disposition.

A reflector 7 is mounted in the bowl portion 1 of the case, and a reflector 8 is mounted in the rim portion 2, the reflector 8 being left open at its center so that the reflector 7 will be visible through the forward open end of the rim 2. A lamp socket 9 is provided in the bowl portion 1 of the case, centrally located with respect to the reflector 7, and an electric lamp bulb 10 is mounted in this socket. Sockets 11 and 12 are provided to be carried by the rim portion 2 in such relation that the electric lamp bulbs 13 and 14 screwed or otherwise mounted therein are disposed adjacent the face of the reflector 8 at each side of the lamp.

A lens 15, which is preferably of red glass is carried by a ring 16' formed in conjunction with the rim 2, it of course being understood that the color of this lens might be changed to comply with the requirement with the particular locality in which the tail lamp is to be used, and the mounting of the lamp in the particular arrangement hereinbefore described so places the same that as the rays from the lamp 10 are concentrated by the reflector 7 and are cast forwardly, these rays will pass through the lens 15 and will be visible through the open outer end of the rim 2. A lens 16 is mounted in a suitable ring 17 which is hinged at 18 at one side on the rim 2 and this ring 17 may be closed over the open end of the rim 2 in such relation that the lens 16 forms a cover for the lamp casing and at the same time the light cast by the lamp 10 through the lens 15 will be visible, or when the lamps 13 and 14 are lighted, the rays therefrom will be reflected through this lens 16 and a white light will be thrown in the rear of the vehicle.

To retain the rim 2 closed to the proper relation to the bowl 1 to form the main body of the casing, a slotted plate 18' is mounted on the rim 2 at a point preferably approximately diametrically opposite to the hinged mounting of this rim so that as the rim is closed against the bowl 1, this plate will fit adjacent to the side of the bowl 1 and a keeper 19 which may be of the usual form is carried on the bowl 1 in a relation to be received in the slot of the plate 18' and this keeper may be then tightened to secure the plate against movement, thus securing the rim 2 against swinging movement to said open relation. A plate 20 is formed on the free edge of the ring 17, and it is provided with a slot to receive the shank of a keeper 21 which is carried on the rim 2, this arrangement of the parts permitting the ring 17 to be secured in the closed relation. A slotted opening is formed at 22, through the side of the bowl 1, and the reflector 7 is purposely cut away as at 23 so that the rays of light projected from the lamp 10 will be cast through this slotted opening at 22, a lens or glass 24 being provided to cover this opening and permit passing of the light rays.

In the use of the tail lamp, it is preferable that the case be mounted adjacent to the mounting of a license tag or plate, and for that matter, a special mounting bracket might be designed to hold the license number tag or plate and to receive the stem of the lamp, and light will be cast through the lens 24 to shine upon the number plate to illumine the same to comply with the regulations and requirements now widely in force. In Fig. 2, we have illustrated by the dotted lines as shown at 25 the approximate positioning of a license number tag or plate.

From the forgoing it will be seen that we have provided a tail-lamp which may be used for automobiles or other vehicles, and which is so constructed that during the major portion of the time the lamp is in use, it may be used only to show a red light to the rear of the vehicle and to illuminate the license number tag or plate, but when it is desired to back the vehicle or for any reason to see the road in the rear of the vehicle, the lamps 13 and 14 may be lighted and a white light will be cast through the lens 16 and will light up the view in the rear of the vehicle.

While we have shown and described the use of two lamps to project the white light through the lens 16, it will be understood that a greater number of lamps may be used, or that even a single lamp arranged to cast its rays upon the reflector and to thus have the light projected through the lens may be used, and also it will be apparent that various other modifications and changes might be made in the form and arrangement of the parts without departing from the spirit and scope of our invention, and hence we do not wish to be limited to the exact disclosure, but only to such points as may be set forth in the claims.

We claim:—

1. A tail lamp comprising a casing, a rim like reflector mounted in the forward part of the casing to have the center thereof open, a reflector mounted in the casing back of the opening of the rim like reflector, a transparent covering for the forward side of the casing, a colored screen mounted in the opening of the rim like reflector, a lamp mounted in the second mentioned reflector, and lamps mounted in conjunction with the rim like reflector to be out of the path of penetration of rays passing from the first mentioned lamp.

2. A tail lamp comprising a casing having an open end, a reflector mounted at the opposite end of the casing, a rim like reflector mounted within the casing adjacent to the open end and having a central opening in line with the first mentioned reflector, a transparent light screen mounted in the opening of the rim like reflector, a lamp bulb mounted in the first mentioned reflector, and a lamp bulb mounted in conjunction with the rim like reflector adjacent to the side wall thereof.

3. A tail lamp comprising a casing consisting of a bowl and a rim, a lamp mounted in the bowl, a reflector around said lamp, a reflector mounted in the rim and provided with an open center to permit the rays from the lamp in the bowl to be visible, a lens mounted to be penetrated by the rays of light from the lamp, a lamp mounted in conjunction with the rim to have the rays thereof projected by said reflector, and a lens mounted to close the casing.

4. A tail lamp comprising a casing consisting of a bowl and a rim, a lamp mounted in the bowl, a reflector around said lamp, a reflector mounted in the rim and provided with an open center to permit the rays from the lamp in the bowl to be visible, a lens mounted to be penetrated by the rays of light from the lamp, a lamp mounted in conjunction with the rim to have the rays thereof projected by said reflector, a lens mounted to close the casing, said bowl provided with an opening in the side thereof through which the rays from the lamp mounted therein are cast, and means to mount said casing in such a relation that the rays of light cast through the opening will fall upon a license tag or plate.

5. A tail lamp comprising a casing consisting of a bowl and a rim, a lamp mounted in the bowl, a reflector around said lamp, a reflector mounted in the rim and provided with an open center to permit the rays from the lamp in the bowl to be visible, a lens mounted to be penetrated by the rays of light from the lamp, a lamp mounted in conjunction with the rim to have the rays thereof projected by said reflector, a lens mounted to close the casing, hinged connections between the rim and bowl, and between the outer lens and the rim, and means to secure said members in a relation to close the casing.

In testimony whereof we affix our signatures in presence of two witnesses.

CARL M. BULLOCK,
JOHN T. WICKERSHAM.

Witnesses:
J. B. ARNOLD,
C. G. WICKERSHAM.